Nov. 10, 1959  G. L. HILL  2,912,035
TRACTION DEVICE FOR VEHICLES
Filed Sept. 23, 1957  3 Sheets-Sheet 1

INVENTOR
Gerald L. Hill
BY
ATTORNEY

Nov. 10, 1959
G. L. HILL
2,912,035
TRACTION DEVICE FOR VEHICLES
Filed Sept. 23, 1957
3 Sheets-Sheet 2
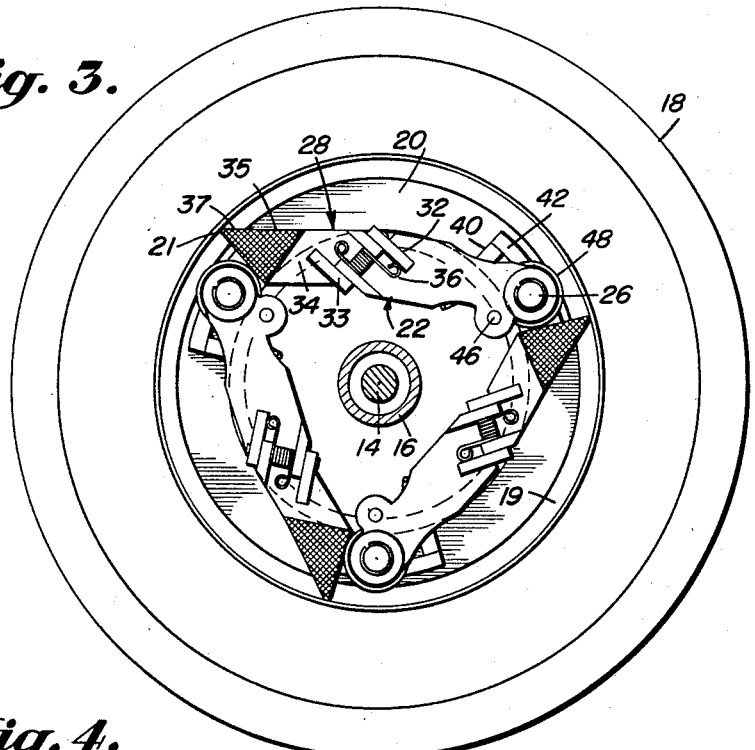
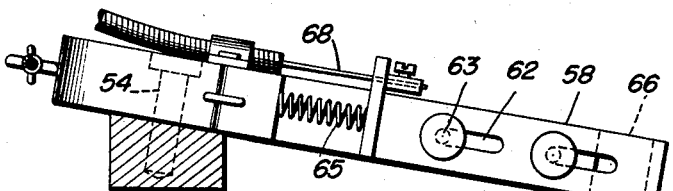
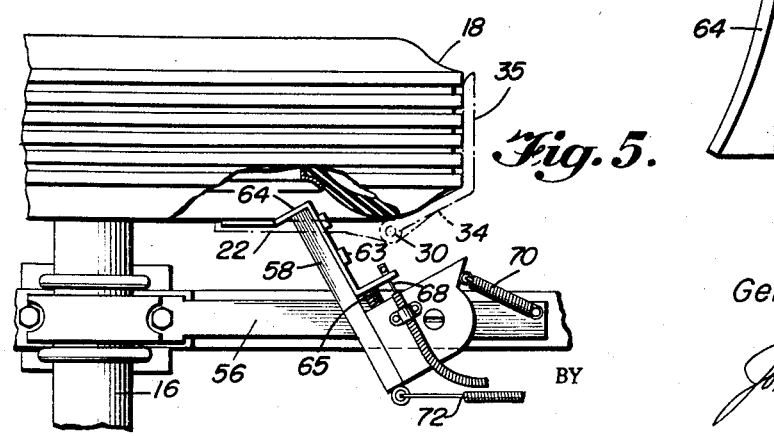
INVENTOR
Gerald L. Hill
ATTORNEY

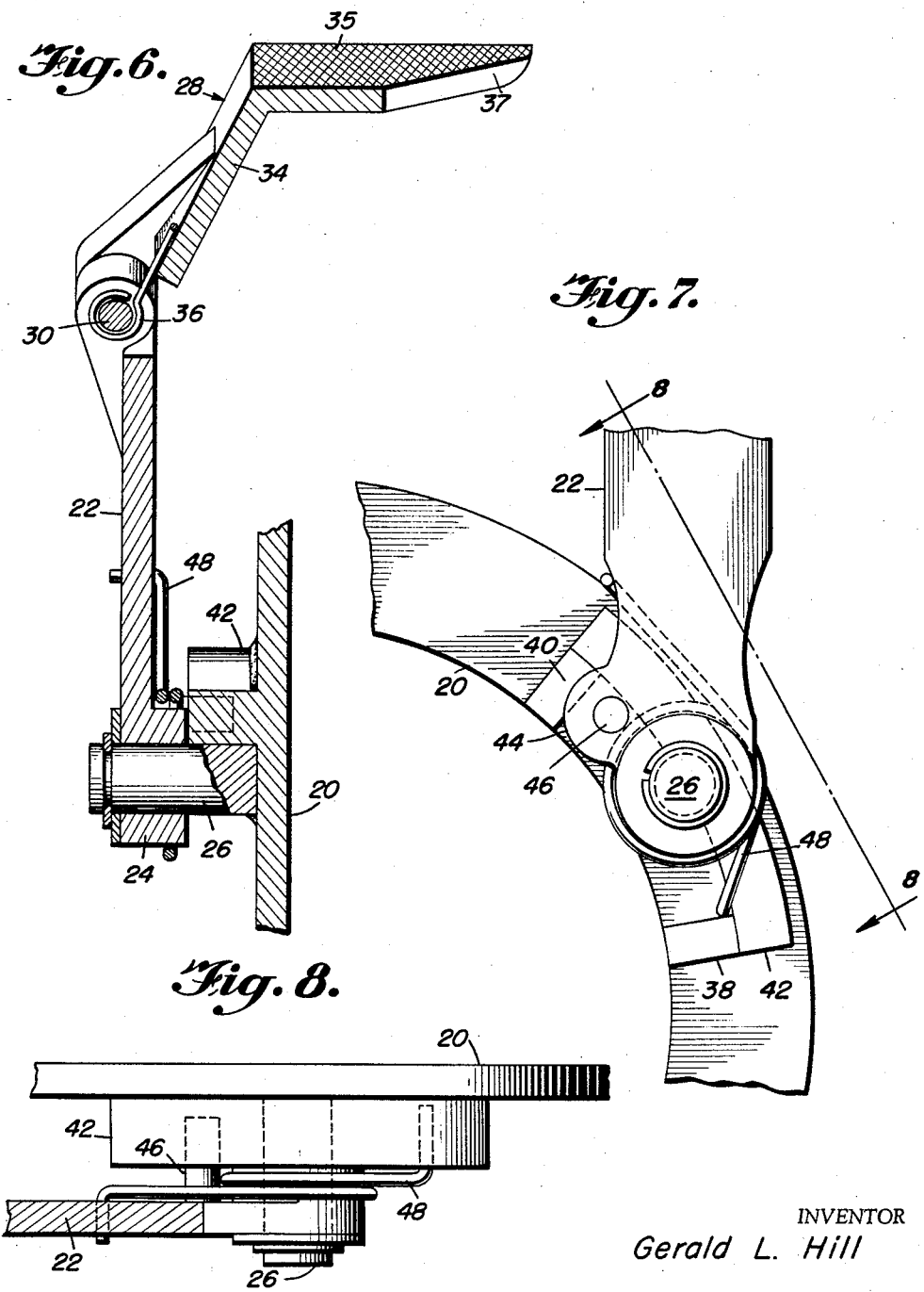

United States Patent Office 2,912,035
Patented Nov. 10, 1959

2,912,035
TRACTION DEVICE FOR VEHICLES
Gerald L. Hill, Allentown, Pa.
Application September 23, 1957, Serial No. 685,519
12 Claims. (Cl. 152—216)

This invention relates to traction devices for automotive vehicles and the like, and more particularly to traction devices mounted on the vehicle and adapted to be moved automatically to operative or inoperative position under control of the operator of the vehicle.

Various attempts have been made in the prior art to provide anti-skid or traction devices for automotive vehicles which are mounted substantially permanently on the vehicle and are moved into and out of traction position in accordance with the road conditions. Most of the devices for this purpose which have been thus far developed are relatively complicated in construction and consequently expensive to manufacture and install. A further disadvantage of many of the prior art devices of this type is that they are mounted upon the vehicle in such manner when in inoperative position as to be subjected to impact from slush and the like with the result that the operating mechanism of these prior art devices frequently becomes encrusted with ice and slush to such an extent as to prevent movement of the device into operative position when required.

Still another disadvantage of many anti-skid devices of the prior art is that they are rigidly mounted on the wheel in such manner as to be unable to absorb road shocks frequently encountered in driving.

Accordingly, it is an object of this invention to provide a traction device for automotive vehicles which is uncomplicated in construction and inexpensive to manufacture and install, and which may be easily installed at the factory on newly built automotive vehicles or on vehicles already in use.

It is another object of this invention to provide a traction device for automotive vehicles which is movable to an inoperative position where it is less likely than devices of the prior art to become encrusted with ice and slush which would prevent its movement to operative position.

Still another object of this invention is to provide a traction device for automotive vehicles which is easily and automatically moved from inoperative to operative position or vice versa by forward rotation of the wheels under the control of an actuating mechanism which may be controlled from the interior of the vehicle.

A further object of the invention is to provide a traction device which is mounted on an automotive vehicle in such manner as to easily absorb road shocks.

In achievement of these objectives, there is provided in accordance with an embodiment of this invention a traction device for automotive vehicles and the like including a ring member which is supported for free rotary movement between the radially inner edge of the inside surface of the wheel rim and the radially outer edge of the brake drum on which the wheel is mounted in such manner as to use the wheel for the radially outer bearing and the brake drum for the radially inner bearing of the ring. A plurality of traction members are pivotally supported by the ring at circumferentially spaced apart points thereof. Each traction member includes a radially extending cleat support arm having hingedly connected thereto at its outer end a cleat member of generally L-shape. In the normally inoperative position of the traction device, each of the cleat support arms is held in a radially retracted postion by the engagement of its connected cleat member with a bead or lip on the inner surface of the wheel rim. An actuating device is movable into the path of the latched arm members by means of a control cable actuable from the interior of the motor vehicle. The actuating device in the embodiment shown includes a slide member which is movable to form a channel which defines a cam groove receiving the latched cleat member in such manner as to unlatch each cleat member from engagement with the rim lip or bead by which it is retained. This permits the cleat support arm of the traction device to swing radially outwardly to a position in which the L-shape cleat member is snapped by a biasing spring into position over the tread of the tire where it serves as a traction element. The same actuating member which supports the slide defining the channel which unlatches the cleat members may also be moved into the path of the cleat support arms in their actuated position in such manner that it engages the actuated cleat support arms and moves them back to their retracted or inoperative position with consequent movement of of the cleat members to retracted position.

Further objects and advantages of the invention will become apparent from the following description taken in conjunction with the accompanying drawings in which:

Fig. 3 is a side elevation view of the wheel of Fig. 1 with the cleat members in latched inoperative position;

Fig. 4 is a side elevation view of the actuating device, with the slide member in a position in which it forms the unlatching channel;

Fig. 5 is a top plan view, partially broken away, of the wheel of Fig. 1, showing the actuating device positioned to move the cleat support arms and their connected cleat members to retracted position;

Fig. 6 is a front elevation view of a cleat support arm and its connected cleat member;

Fig. 7 is an enlarged detail view in side elevation showing the connection of the cleat support arm to the ring member which supports it; and Fig. 8 is a view taken along line 8—8 of Fig. 7.

Figure 1:
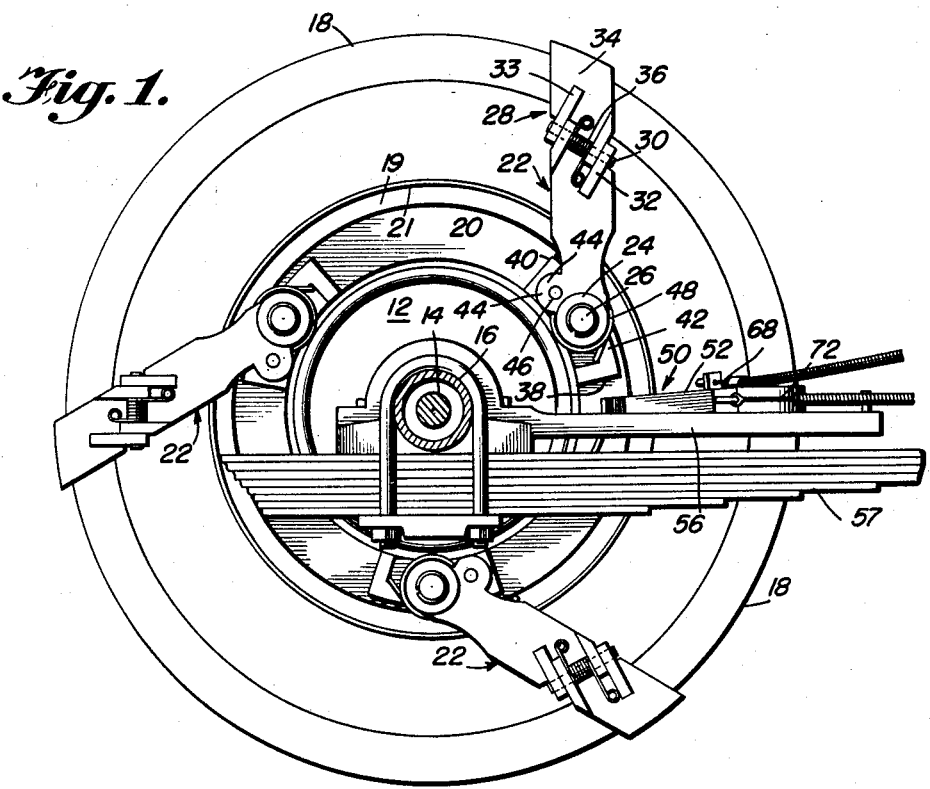
Fig. 1 is a side elevation view of a wheel equipped with the traction device of the invention, showing the traction members in actuated position.

Referring now to the drawings, there is shown a wheel generally indicated at 10 secured by bolts to a brake drum 12 which in turn is secured to and rotatable with a shaft 14 mounted for rotation inside of a hollow axle 16. A tire 18 is mounted on rim 19 of wheel 10. The construction thus far described is a conventional automotive wheel assembly arrangement. The wheel shown in the drawings is assumed to be the left rear wheel of the vehicle. It will be understood that the traction device would be installed on both rear wheels of the vehicle and could also be installed on the front wheels of the vehicle.

The traction device of the invention includes a circular ring member 20 which is positioned between the radially outer surface of brake drum 12 and the radially inner surface of rim 19 of wheel 10, brake drum 12 serving as the inner bearing surface for ring 20 and rim 19 of wheel 10 serving as the radially outer bearing surface for ring 20. A plurality of cleat support arm members each generally indicated at 22 and each including at its radially inner end a hollow hub member 24 is supported for pivotal movement by a stud member 26 which is rigidly secured to and extends inwardly from the inner face of ring 20.

An L-shaped cleat member generally indicated at 28 is hingedly connected to the outer end of arm 22 by means of a pin 30 which extends through hinge elements 32 and 33 respectively provided on cleat support arm 22 and on cleat member 28. Each of the L-shaped cleat members 28 includes a side 34 having one end hinged to arm 22, and a side 35 which is integral with and extends at an angle of slightly more than 90 degrees from side 34 of the cleat member. Side 35 terminates in a pointed toe member 37. When the cleat member is in operative position as shown in Fig. 1, side 35 of the cleat member overlies the tread of the tire. As best seen in the view of Fig. 6, the surface of side 35 which engages the ground is roughened to improve the traction properties of the cleat. A torsion spring 36 surrounds the pin member 30 which connects cleat 28 to arm 22, spring 36 tending to move the cleat into the plane of the paper with respect to the views shown in the drawings in such manner that it tends to grip the tread of the tire when in operative position.

The stud member 26 upon which arm 22 is pivotally mounted is located within an area of ring 20 bounded by a generally U-shaped raised edge portion defined by two radially extending raised edges 38 and 40 joined by a circumferentially extending edge 42. This U-shaped raised portion defines a stop member which limits movement of arm 22 in moving to operative position. Arm 22 is provided adjacent its radially inner end with an extension 44 which carries on the surface thereof directed towards the outside of the vehicle a pin member 46 which engages the radially inner surface of raised edge 32 to limit the radially outward movement of arm 22. A torsion spring 48 extends around the hub 24 of arm 22. One end of spring 48 engages the inner surface of raised edge 38 while the opposite end of the spring engages an edge of arm 22 in such manner as to urge arm 22 in a radially outward direction about its pivotal connection to stud 26.

An actuating assembly, generally indicated at 50 (Figs. 2, 4, 5) is provided for the traction members hereinbefore described. The actuating assembly includes a lever member 52 which is mounted for pivotal movement about a pin 54 on a bracket arm 56 which is rigidly connected to the rear axle 16 of the vehicle. Bracket arm 56 overlies leaf spring 57 of the vehicle. Lever 52 has rigidly attached thereto an arm member 58 which extends toward the inside surface of the wheel when the actuating assembly is in the position shown in Fig. 2. A slidable arm member 60 having slots 62 (Fig. 4) which engage pins 63 carried by arm member 58 carries at its outer end an arm portion 64 which extends substantially perpendicularly to slidable arm 60. A spring 65 normally urges arm 60 in an outward direction in such manner as to define a channel 66 between arm portion 64 at the outer end of slidable arm 60 and the outer end of arm 58. As will be explained more fully hereinafter, channel 66 is a cam groove which engages cleat 28 in such manner as to cam the cleat out of latched engagement with the rim of the wheel. A flexible wire 68 actuated from the interior of the vehicle is movable to move slidable arm 60 against the force of spring 65 in such manner as to close the channel just described when desired. Lever 52 is normally biased by spring 70 in a clockwise direction with respect to the view shown in Fig. 2 in such manner as to move arm 58 and the slidable arm 60 to the position where the channel 66 formed by arm portion 64 is in the path of movement of the latched cleat members. A flexible wire 72 actuated from the interior of the vehicle may be operated to move lever 52 and its attached arms 58 and 60 into an inoperative position in which arm 58 extends substantially parallel to bracket 56 and is entirely clear of wheel 10.

Operation

When the traction devices of the invention are not in use, they are in the retracted position shown in Fig. 3 of the drawings in which the arm members 22 are in a radially inward position against the force of their biasing springs 48 and the pointed toe portions 37 of cleat members 28 are latched or held in the detent provided by the bead portion 21 of wheel rim 19. When it is desired to move the traction devices to operative position due to road conditions, flexible wire 72 is released at the interior of the vehicle to permit spring 70 to move actuating lever 52 to the position shown in Fig. 2 of the drawings in which the outer end of arm 58 is positioned adjacent the path of movement of sides 35 of cleat members 28 in their latched position. Flexible wire 68 is also actuated from the interior of the vehicle to permit spring 65 to move slide arm 60 to the position shown in Fig. 2 of the drawings in which arm portion 64 of slide arm 60, together with the outer end of arm 58, defines a channel 66 in the path of movement of cleat members 28.

Figure 2:
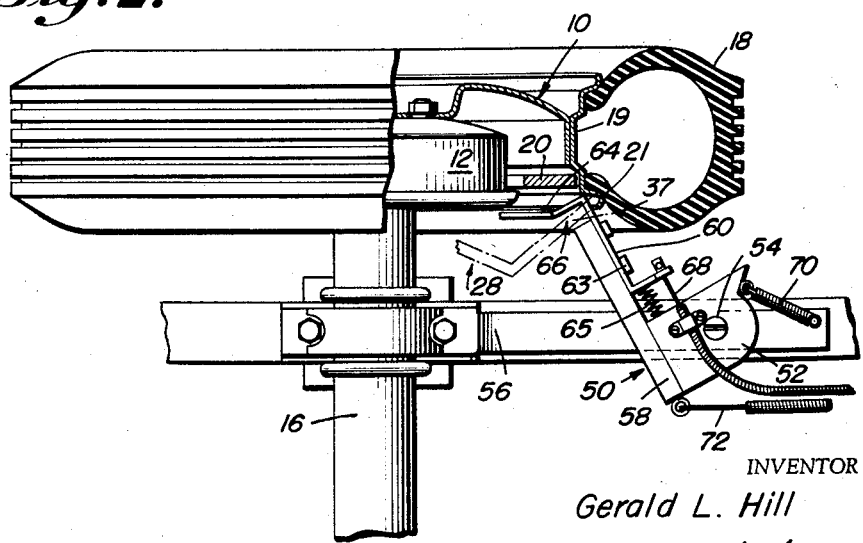
Fig. 2 is a top plan view of the wheel of Fig. 1, partially broken away, showing the actuating device in position to unlatch the cleat members.

With the actuating assembly in the position shown in Fig. 2 and as just described, wheel 10 is caused to move forwardly or in a clockwise direction with respect to the views shown in the drawings, it being assumed that the wheel shown in the drawings is the left rear wheel of the vehicle. As the latched cleat members move toward channel 66 of the actuating device, the leading edge of toe 37 of cleat member 28 enters channel 66. As toe 37 of the cleat member moves through the channel the toe is cammed out of its latching engagement with bead 21 of rim 19 of the vehicle wheel 10.

After toe 37 of the cleat member has completely passed through channel 66, cleat support arm 22 is moved by its biasing spring 48 in a clockwise or forward direction with respect to the views shown in the drawings across the side wall of the tire until it finally assumes the position shown in Fig. 1. The radially outer movement of arm 22 is limited by the engagement of stop pin member 46 carried by the radially inner end of arm 22 with stop edge 42. As arm 22 reaches its limiting position shown in Fig. 1, spring 36 between cleat member 28 and arm 22 causes cleat member 28 to snap over into engagement with the tread of the tire, with the outer side 35 of cleat 28 lying in substantially direct engagement with the tread of the tire. As the wheel continues to move forwardly, the successive traction members are actuated as just described, each latched cleat member being unlatched by engagement with the channel 66 as just described to permit the combined action of the torsion springs 36 and 48 to move the arms 22 radially outwardly and to move the cleat members 28 into engagement with the tread of the tire. Due to the frictional engagement of cleat members 28 with the tires, ring 20 and the attached traction members rotate with the wheel. However, under the impact of road shock, ring 20 can move relative to wheel 10, thereby avoiding undue strain on the traction members which might occur if the ring were rigidly connected to the wheel.

After the three traction members shown in the drawings have been moved to their operative position, the actuating device generally indicated at 50 is then retracted into inoperative position by means of flexible wire 72, wire 72 being suitably latched or otherwise held in position to maintain actuating device 50 free and clear of the wheel.

When it is desired to return the traction members to their inoperative position from the operative position shown in Fig. 1, wire 72 is released to permit spring 70 to move lever 52 and its connected arm 58 from their retracted position to the position shown in Fig. 5. For this operation, flexible wire 68 is also actuated to draw slide member 60 against the force of spring 65 to close channel 66, as shown in Fig. 5.

With the actuating device 50, including arm 58 and its associated slide member 60 in the position shown in Fig. 5, and with the traction members in their operative position as shown in Fig. 1, the wheel is then moved forwardly or in a clockwise direction with respect to the view shown in Fig. 1 to cause the successive cleat support arms 22 to abut against arm 58 of actuating device 50. This causes each cleat support arm 22 to move backwardly or in a counterclockwise direction as wheel 10 advances forwardly in a clockwise direction with respect to the view shown in Fig. 1. The arms 22 and their connected cleat members 28 swing backwardly across the side wall of the tire until the toe portion 37 of cleat member 28 becomes latched under the detent formed by bead 21 of wheel rim 19. The wheel is then rotated until the next successive arm 22 abuts against actuating arm 58 to move cleat support arm 22 and its connected cleat member 28 to retracted position as just described. This operation is repeated until all of the traction members are moved to their retracted position.

It can be seen from the foregoing that there is provided in accordance with this invention a traction device for use with automotive vehicles which is relatively uncomplicated in construction and operation, and which can be manufactured and installed very inexpensively. The traction assembly hereinbefore described is adapted either for factory installation on new automobiles or for installation on automobiles already in use since the traction device can be easily attached to any automotive vehicle. The use of the ring member for supportng the traction device and its freely movable relation with respect to the wheel and with respect to the brake drum eliminates any shocks which might occur to the apparatus either while driving with the traction devices in operative position or in moving the traction members from inoperative to operative position. The traction assembly has the advantage that it is adapted to be operated from its inoperative to operative position or from its operative to inoperative position by controls located in the interior of the motor vehicle. A further advantage of the construction hereinbefore described is that the traction members when in retracted or inoperative position are located a substantial distance radially inwardly of the tread of the tire at a position which minimizes the accumulation of ice and slush on the operating mechanism which would adversely affect its operation.

While there has been shown and described a particular embodiment of the invention, it will be obvious to those skilled in the art that various changes and modifications may be made therein without departing from the invention, and therefore, it is aimed to cover all such changes and modifications as fall within the true spirit and scope of the invention.

I claim:

1. A traction device for use on a vehicle wheel of the type having a tire-receiving rim and a tire mounted on the rim, comprising a cleat means, means for pivotally supporting said cleat means radially inwardly of the rim of the wheel, said cleat means being pivotally movable between a radially outward and a radially retracted position, spring means biasing said cleat means toward said radially outward position, and detent means engaging said cleat means to hold said cleat means in said radially retracted position against the force of said spring means.

2. A traction device as defined in claim 1 in which said detent means is formed by a lip on the rim of the vehicle wheel.

3. A traction device as defined in claim 1 in which said means for pivotally supporting said cleat means is arcuately rotatable independently of the vehicle wheel in the same vertical plane but locks and turns with the vehicle wheel when said cleat means is engaged with a tire carried by the vehicle wheel.

4. A traction device for use on a vehicle wheel of the type having a tire-receiving rim and a tire mounted on the rim, comprising a cleat means, means for pivotally supporting said cleat means radially inwardly of the rim of the wheel, said cleat means being arcuately and pivotally movable in coplanar relationship to the wheel rim between a radially outward and a radially retracted position, spring means biasing said cleat means toward said radially outward position, said cleat means including an outer portion engageable with the tread of the tire when said cleat means is in said radially outward position, and detent means engaging said outer portion of said cleat means to hold said cleat means in said radially retracted position against the force of said spring means.

5. A traction device as defined in claim 4 in which said cleat means includes a pointed toe portion at the outer end thereof and said detent means is formed by a lip on the rim of the vehicle wheel, said toe portion engaging said lip when said cleat means is in said radially retracted position.

6. A traction device for use on a vehicle wheel of the type having a tire-receiving rim and a tire mounted on the rim, comprising a cleat means, means for pivotally supporting said cleat means radially inwardly of the rim of the wheel, said cleat means being pivotally movable between a radially outward and a radially retracted position, spring means biasing said cleat means toward its radially outward position, detent means engaging said cleat means to hold said cleat means in said radially retracted position against the force of said spring means, and means carried by said vehicle for selectively moving said cleat means to radially retracted position to engage said cleat means with said detent means or for moving said cleat means out of engagement with said detent means to permit said spring means to move said cleat means to said radially outward position.

7. A traction device for use on a vehicle wheel of the type having a tire receiving rim and a tire mounted on the rim, comprising a cleat support arm, means for pivotally supporting said cleat support arm radially inwardly of the rim of the wheel, said cleat support arm being pivotally movable about its support means between a radially outward and a radially retracted position, spring means biasing said cleat support arm toward said radially outward position, a cleat connected to an outer end of said cleat support arm and engageable with the tread of a tire carried by the vehicle wheel when said cleat support arm is in said radially outward position, detent means engaging said cleat when said cleat support arm is in said radially retracted position, and actuating means carried by said vehicle for selectively moving said cleat support arm to radially retracted position to engage said cleat with said detent means or for moving said cleat out of engagement with said detent means to permit said spring means to move said cleat support arm to said radially outward position.

8. A traction device as defined in claim 7 in which said cleat is hinged to said cleat support arm and including spring means biasing said cleat toward the surface of a tire carried by the vehicle wheel.

9. A traction device as defined in claim 7 in which said actuating means includes a cam means engaging said cleat when said cleat support arm is in radially retracted position, said cam means being operable to cam said cleat out of engagement with said detent means.

10. A traction device as defined in claim 7 in which said actuating means includes a lever member movable to a position adjacent the path of movement of said cleat when said cleat support arm is in radially retracted position, and a slide member carried by said lever member and movable to form a camming channel in the path of said cleat, engagement of said cleat with said camming channel being effective to cam said cleat out of engagement with said detent means.

11. In combination with an automotive vehicle having a wheel mounted on a brake drum, said wheel including a peripheral rim spaced radially outwardly of said brake drum, a ring member positioned between said rim member and said brake drum and freely rotatable relative to both said rim and said brake drum, a cleat means pivotally connected to said ring member and pivotally movable about its connection to said ring member between a radially outward and a radially retracted position, spring means biasing said cleat means toward its radially outward position, detent means engaging said cleat means when said cleat means is in said radially retracted position, and means carried by said vehicle for selectively moving said cleat means to radially retracted position to engage said cleat means with said detent means or for moving said cleat means out of engagement with said detent means to permit said spring means to move said cleat means to said radially outward position.

12. In combination with an automotive vehicle having a wheel mounted on a brake drum, said wheel including a peripheral rim spaced radially outwardly of said brake drum, a ring member positioned between said rim member and said brake drum and freely movable relative to both said rim and said brake drum, a plurality of cleat support arms pivotally connected at circumferentially spaced points along said ring member, a cleat member pivotally connected at an outer end of each cleat support arm, each of said cleat support arms being pivotally movable about its pivotal connection to said ring member between a radially outward and a radially retracted position, first spring means biasing each cleat support arm toward its radially outward position, second spring means biasing each cleat member toward the surface of a tire carried by the vehicle wheel, detent means engaging each of said cleat members when said cleat support arms are in radially retracted position, and means carried by said vehicle for selectively moving said cleat support arms to radially retracted position to engage said cleat members with said detent means or for moving said cleat members out of engagement with said detent means to permit said first and second spring means to move said cleat members into engagement with said tire.

References Cited in the file of this patent

UNITED STATES PATENTS

| | | |
|---|---|---|
| 2,494,850 | Williams | Jan. 17, 1950 |
| 2,517,634 | Daley | Aug. 8, 1950 |